(12) United States Patent
Rekhif et al.

(10) Patent No.: US 6,387,427 B1
(45) Date of Patent: May 14, 2002

(54) METHOD OF PRESERVATION OF A FOOD PRODUCT

(75) Inventors: Nadji Rekhif, Winterthur-Iberg (CH); David Collins-Thompson, New Milford, CT (US); Van Vadhera, New Milford, CT (US); Cheng-An Hwang, New Milford, CT (US)

(73) Assignee: Nestec S.A., Vevey (CH)

( * ) Notice: Subject to any disclaimer, the term of this patent is extended or adjusted under 35 U.S.C. 154(b) by 13 days.

(21) Appl. No.: 09/671,702

(22) Filed: Sep. 28, 2000

(51) Int. Cl.⁷ ............................................. A23L 3/3463
(52) U.S. Cl. ...................................... 426/335; 426/532

(58) Field of Search .............................. 435/140, 252.1, 435/252.9, 823; 426/7, 9, 14, 17, 532, 654, 321, 335

(56) References Cited

U.S. PATENT DOCUMENTS

| | | | |
|---|---|---|---|
| 5,431,940 A | 7/1995 | Calderas et al. | 426/330 |
| 5,811,147 A | 9/1998 | Yamada | 426/532 |

*Primary Examiner*—Keith Hendricks
(74) *Attorney, Agent, or Firm*—Winston & Strawn

(57) ABSTRACT

The invention relates to a method of preservation of a food product including adding to a food product a fermentate comprising acetic acid and/or its salts resulting from the fermentation by acetic acid producing bacteria, and wherein the food is maintained at pH below 5.8.

12 Claims, No Drawings

METHOD OF PRESERVATION OF A FOOD PRODUCT

FIELD OF THE INVENTION

The present invention relates to a method for preserving food products using an antimicrobial system. More particularly, the invention relates to the use of an antimicrobial system containing acetic acid and/or salt of acetic acid effective for controlling growth of spoilage and/or pathogenic bacteria in chilled foods and beverages.

BACKGROUND OF THE INVENTION

Food can be unsafe to eat or drink, for many reasons. It can contain toxins or viruses, and even parasitic protozoa and worms. More frequently in Western countries, food is subjected to pathogenic bacteria poisoning.

For instance, *Escherichia coli* has been known for years to cause diarrhoea in infants, and gastro-enteritis in humans, associated with abdominal cramps, low-grade fever, nausea and malaise. *Escherichia coli* can be found in water, leading to food contamination. It is frequently isolated from dairy products, such as Semi-soft cheeses, for example.

Salmonella spp. are Gram-negative bacteria widespread in poultry and swine, but the environmental sources of these organisms also include water, soil, insects, factory or kitchen surfaces, raw meats and seafoods, etc. They are responsible for acute symptoms, but are also frequently associated with chronic consequences such as arthritic symptoms.

*Bacillus cereus* is a Gram-positive bacterium incriminated in a wide variety of foods including meats, milk, vegetables, fish, and starchy foods. It causes diarrhoea, abdominal cramps, pain and nausea.

*Listeria monocytogenes* is particularly dangerous to pregnant women and elderly people. The manifestations of this Gram-positive bacterium include septicaemia, meningitis, encephalitis, or intrauterine or cervical infections it pregnant women. This bacterium may be found in foods such as raw milk, cheeses, ice cream, raw vegetables, raw meats, fermented raw-meat sausages, etc. Its ability to grow at temperatures as low as 3° C. permits multiplication in refrigerated foods.

Commercial acetic acid, acetates, and more specifically sodium acetate, as produced from gas or oil, are known as having antimicrobial properties against many foodborne pathogens, especially against Salmonella spp and *Escherichia coli*, particularly when used in combination with primary hurdles such as temperature and/or high acidity. However, these compounds are less effective when they are used as a primary hurdle against microorganisms such as *Listeria monocytogenes*, lactic acid bacteria, yeast and molds.

The preservative properties of acetic acid and salts of acetic acid in foods are described in the literature. In particular, U.S. Pat. No. 5,811,147 relates to a food and beverage preservative comprising a calcium component dissolved in a fermented solution of vinegar, alcohol, and a fermenting agent. The calcium component, coming mostly from shells or bones, is present in an amount of 3000 to 4000 mg, in 100 to 200 cc of the preservative solution. The preservative contains a relatively high concentration of alcohol (5 to 95%) as resulting from the process of producing the preservative, which has a positive effect on reduction of bacteria but may render the use of the preservative unsuitable for some food or beverage categories and, more specifically, as it may adversely affect the taste and flavor of the food product. Furthermore, the preservative composition contains calcium in amounts which increases the final cost of the food product. Furthermore, in certain circumstances, calcium-containing food may be not allowed for people having specific diseases such as hyperparathyroidies, kidney lithiasis, hypersensitivity to vitamin D or others.

U.S. Pat. No. 5,431,940 relates to a process for preparing noncarbonated beverage products with improved microbial stability which comprises mixing of a preservative (chosen from the group consisting of sorbic acid, benzoic acid, alkali metal salts thereof and mixtures thereof, fruit juice, polyphosphates and water. The process aims to control microbial growth in noncarbonated diluted juice beverages.

The methods of preservation of food of the prior art have restricted applications in the food and beverage domain, in particular, in the conditions of preservation of chilled products. Furthermore, none of the methods have proved to give a satisfactory inhibitory effect on pathogenic bacteria, in particular on *Listeria monocytogenes*, at chilled or abuse temperatures. The present invention proposes to overcome these problems, with the aim of obtaining a method of preservation usable for food and beverage, while controlling the growth of microorganisms capable of causing spoilage and/or pathogenic infection of the product.

SUMMARY OF THE INVENTION

The present invention provides an efficient and cost effective method for preserving food products from spoilage of microorganisms, for shelf life extension or pathogenic microorganisms, in particular, even if non-exclusively, *Listeria monocytogenes,* at chilled and chilled abuse temperatures. This method comprises adding to a food product an alcohol-free fermentate comprising of acetic acid and/or its salts resulting from the fermentation by acetic acid producing bacteria, and wherein the food is maintained at pH below 5.8.

It has been found that a fermentate of acetic acid or its salts used as a preservative system, by itself, as opposed to commercial or pure acetic acid or salt of acetic acid, had an improved inhibitory effect on Gram- negative and Gram-positive bacteria in food products during storage at chilled and chilled abuse conditions during the storage of the food product provided the acidity of the food product can be maintained at a sufficient level.

It has also been found that the inhibitory effect was even more remarkable at pH of about 5.6 or below, of the food product. The pH of the product has proved to be important for the fermentate to be fully effective. In particular, it is theorized that at lower pH, as defined, a sufficient amount of undissociated acetic acid compounds is formed in the food product which effects inhibition on the pathogenic microorganisms.

An inhibitory effect is also noticed particularly when the fermentate is added to the food product in an amount corresponding to a concentration of about 0.2 to 1% by weight of acetic acid and/or its salts, upon the weight of the food product. Preferably, the fermentate is added to the food product in an amount of from about 0.25 to 0.6 % by weight of acetic acid or its salts based upon the weight of the food product. A superior inhibitory effect is noticed at 0.5 (+/− 0.01) % by weight.

The method of the invention includes the step of producing a fermentate of acetic acid and/or salt of acetic acid from a bacterial growth medium inoculated with an acetic acid producing bacterium and sodium hydroxide so as to produce said acetic acid and/or salt of acetic acid at a controlled pH.

A preferred pH of the medium is of from about 3.8 to 5.2, preferably of about 5. At such a pH level, the resulting fermentate, when transformed into a powder, has improved flowing properties. The medium preferably comprises at least one carbohydrate, alcohol, yeast extract, peptone and water.

Fermentation is preferably carried out for at least 2 days, preferably for about 5 to 10 days, even more preferably for 7 days, so as to reach an effective amount of growth of the acetic acid producing bacterium and of a suitable concentration of acetic acid and acetate in the fermentate. A suitable concentration of acetic acid and salt of acetic acid in the fermentate is about 3 to 6 g/L.

In a preferred aspect of the invention, the method further comprises the step of drying of the fermentate prior to its addition to the food product so as to produce a powdered preservative. Drying of the fermentate enables the reduction of the alcoholic compounds to infinitesimal and negligible concentrations, favors the stability of the preservative over time and facilitates the proper dosage of the preservative in the food product.

DETAILED DESCRIPTION OF THE INVENTION

As used herein, "food" means a food or a beverage, and "food product" means a food product or a beverage product.

As used herein, "chilled" temperature means a temperature in the range of about 0 to 10° C. and "chilled abuse" temperature means a temperature range of about 10 to 30° C.

In the present specification, the abbreviation "GRAS" will be written instead of the full expression "Generally Recognized As Safe".

The invention provides a broad spectrum GRAS antimicrobial system based on acetate that is effective against both Gram-negative and Gram-positive bacteria at chilled and chilled abuse temperatures.

The method of the invention produces an antimicrobial agent, which comprises mainly salts of acetic acid and/or acetic acid, and other fermentation end-products such as free fatty acids, hydrogen peroxide, and organic acids.

The fermentating agent can be any producers of acetic acid in presence of sodium hydroxide in the medium of culture. Sodium hydroxide is added to the medium as a proper source of sodium. For example, the fermenting agent can be chosen in the Acetobacter genus. In a preferred embodiment, the organism used is an *Acetobacter aceti*. The bacteria can also be, for example, *Gluconacetobacter liquefaciens, Gluconacetobacter xylinus, Gluconacetobacter hansenii, Gluconacetobacter diazotrophicus, Brachyspira pilosicoli* or *Gluconacetobacter europaeus*.

Acetate, in particular sodium acetate, is recognised as GRAS by the Food and Drug Administration (FDA), which means they are chemicals designated by the FDA as safe when used under good manufacturing conditions (Code of Practic, Chapter 21, Section 182–186). *Acetobacter aceti* is also a GRAS micro-organism.

An example of medium of culture for the acetic acid producing bacteria comprises between about 0.05 to 2% of carbohydrate(s), about 0.05 to 2% peptone, about 0.1 to 1% yeast extract, about 1 to 8 % alcohol, about 5 to 15% of fermenting agent or inoculum and water (all percentages given by weight). A preferred medium is about 0.08–1.2% of carbohydrate(s), about 0.08–1.2% of peptone, about 0.3–0.7% yeast extract, about 2–5% ethanol, about 8–12% inoculum and water.

Suitable carbohydrates are monosaccharides such as glucose, fructose or galactose, di-sachaccharides such as sucrose naturally found in sugar cane or sugar beet or oligosaccharides such as those resulting from the partial hydrolysis of starch. A preferred carbohydrate is glucose at an amount of between about 0.08 to 1.2 % by weight of the medium.

During the fermentation step, the pH of the fermentate is controlled and modified accordingly to remain preferably below 6. Preferably, the pH is below about 5.2, and preferably is between about 4.5 to 5.2. The pH is controlled by addition of NaOH, or any other bases, such as calcium hydroxide, known to be used in ingredients entering in food compositions. The incubation is processed at a temperature of from about 25 to 35° C. for at least 2 days, preferably for at least about 4 to 10 days, to allow a sufficient level of acetic acid and/or salts of acetic acid to be produced.

During the fermentation, acetate, more particularly sodium acetate, is produced. Other organic acids, organic phosphates and polysaccharides, are also present in the fermentate medium. The mechanism by which the enhanced inhibition occurs with the fermentate remains unknown. However, these compounds as well as other metabolites are likely to produce a synergetic influence with the acetate on the antimicrobial effect.

After fermentation, the fermentate is pasteurized in order to inactivate the bacteria developed during he fermentation process. Pasteurization is carried out at temperatures sufficient to inactivate the acetic acid producing bacteria but lower enough to prevent acetate from volatilizing. Therefore, pasteurization temperatures are about 85–100° C. for about 5 to 25 min. It is also possible to use any other process allowing to kill the bacteria and while preserving the properties of the acetic acid or the acetic acid salts. The pasteurized solution is then submitted to a drying stage to transform the liquid into a solid fermentate. Various techniques may be used for drying the fermentate, as for instance, spray drying, vacuum drying, freeze drying, or any other drying method known to be used for biological or nutritional drying.

The dried fermentate has preferably a concentration in acetic acid and/or salt of acetic acid of between about 65 and 85% by weight, and more preferably about 72%, based upon the weight of the dry fermentate.

The dried fermentate is then added to the food product in a quantity calculated so that the final amount of acetic acid and salt of acetic acid in the food is from about 0.2 to 1% by weight, and preferably about 0.25 to 0.6% by weight, based upon the total weight of the food product. The concentration in the food product is simply calculated based on the concentration in fermentate.

Without willing to be bound by theory, it is believed that the observed antimicrobial effect is probably due to the presence of other metabolite(s) and end-products produced during the fermentation, in the fermentation conditions as previously defined, which act(s) in a synergetic effect with acetic acid and/or salt of acetic acid.

The possible applications of the system of preservation of the invention lie in meat fementations where acetate not only acts as an antimicrobial but also as a flavoring agent. It is also envisioned that the fermentate could be used as an additive in chilled products where *Listeria monocytogenes* would pose a problem such as chilled vegetables or cheese components.

EXAMPLES

The following examples are given by way of illustration of the present inventions and should in no way be considered as limitative.

Example 1 - Production of the Fermentate

*Acetobacter aceti* ATCC 15973 is propagated in a "GPYE" medium composed of 1 g glucose, 1 g peptone, and 5 g yeast extract in 1 liter of deionised water. It is cultivated in 500 mL flasks containing 150 mL GPYE. The incubation is processed at temperatures of 28° C., with agitation (300 rpm), for 5 days.

The pre-culture (130 mL) is then inoculated in a 2 liter fermentor containing 1.3 liter of GPYE with 40% food-grade ethanol. This second fermentation is run at a temperature of 28° C., at 350 rpm agitation and 0.2 vvm air flow rate. Two fermentations were run, at controlled pH 4.0 (with 20% of NaOH) and pH 5.0 (20% of NaOH), respectively.

Periodically, samples were withdrawn and plate counting was carried out in GPYE agar medium at 30° C. for 4 days.

The production of sodium acetate is measured by HPLC (High Pressure Liquid Chromatography), the HPLC using an organic acid analysis column (Aminex, Ion exclusion HPX-87H, BioRad, USA) with a H2SO4 mobile phase (0.009 N), at 210 nm.

In the conditions herein described, the growth of *Acetobacter aceti* and the production of sodium acetate have been studied at controlled pH of 5. As showed in Table 1, after 1 day of lag phase, the bacterial cells start growing and reach a stationnary phase after 2 days incubation. The production of sodium acetate starts increasing from the second day of incubation, and continues to increase until the 7th day of incubation, at the time the fomentation can be stopped.

TABLE 1

Growth of *acetobacter aceti* and production of sodium acetate at pH 5.0

| Days | Growth of *A. aceti* ($Log_{10}$ cfu/mL) | Sodium acetate concentration (g/L) |
| --- | --- | --- |
| 0 | 5.2 | 0.73 |
| 1 | 5.7 | 0.80 |
| 2 | 9.0 | 1.71 |
| 3 | 8.9 | 2.00 |
| 4 | 8.9 | 2.10 |
| 6 | 8.8 | 2.65 |
| 7 | 8.7 | 4.38 |

After 7 days of incubation, the fermentate is pasteurized. The pasteurization is carried out at 90° C. during 10 min. The resulting solution is freeze dried, so as to remove water from the product by sublimation and desorbtion. This process is performed in VirTis freeze drying equipment which consists of a drying chamber with temperature controlled shelves, a condenser to trap water removed from the product, a cooling system to supply refrigerant to the shelves and condenser, and a vacuum system to reduce the pressure in the chamber and condenser to facilitate the drying process.

It was observed that the free flowing characteristics of the freeze dried material produced at pH 5.0 was superior to the pH 4.0 material and was used for the challenge experiments.

Example 2 - Challenge Test in Broth Media:

Commercial sodium acetate (Sigma) and the freeze-dried fermentate of the invention (pH 5.0) were tested in Brain Heart Infusion broth (BHI), using single and cocktail tests. BHI was added with:

(a) commercial sodium acetate at final concentrations of 0.25 and 0.5%;
(b) freeze dried fermentate (pH 5.0) at final concentrations of sodium acetate of 0.25 to 0.5%; and,
(c) a control sample consisted of BHI broth without sodium acetate.

For first samples, the pH of BHI broth with or without sodium acetate was adjusted to 5.6 with HCl (10%) and the samples filter-sterilized (0.22 mm, Millipore). For comparative samples, the pH was controlled at 7.0 and the sample filtered-sterilized.

The freeze-dried product was evaluated for its inhibitory actions against Gram-negative Gram-positive bacteria. Twenty-mL samples were inoculated with $10^4$–$10^5$ cfu/mL of *L. monocytogenes, B. cereus, E. coli,* or *S. typhimurium* alone and combined. The samples were incubated at two conditions: at 30° C. for 24 h, and at 12° C. for 2 weeks.

The control samples consisted of samples with and without commercial sodium acetate.

At neutral pH (6.5 to 7.0) and 30° C., neither commercial sodium acetate nor the fermentate inhibit the challenge bacteria, indicating the inefficiency of the inhibitory compounds at neutral pH and 30° C. (Table 2).

TABLE 2

Effect of commercial and fermented sodium acetate on Gram-positive and Gram-negative bacterial strain at pH 7.0, 30° C., and for 24 hours.

| | | | Bacterial growth (optical density 550 nm after 24 hrs) | | | |
| --- | --- | --- | --- | --- | --- | --- |
| Target strains | Time 0 | Control | C 0.25% | C 0.5% | F 0.25% | F 0.5% |
| *Listeria monocytogenes* | 0.010 | 0.455 | 0.429 | 0.399 | 0.385 | 0.326 |
| *Bacillus cereus* | 0.023 | 0.387 | 0.325 | 0.315 | 0.351 | 0.232 |
| *Escherichia coli* | 0.013 | 0.583 | 0.589 | 0.587 | 0.584 | 0.542 |
| *Salmonella typhimurium* | 0.012 | 0.820 | 0.645 | 0.600 | 0.763 | 0.542 |

C: commercial sodium acetate
F: Fermentate of sodium acetate produced via fermentation of *A. aceti*.

At pH 5.6 and below, both commercial sodium acetate and the fermented product exhibited inhibitory effects on the growth of *Escherichia coli, Bacillus cereus*, and *Salmonella typhimurium*. Expanded inhibitory effect was observed with the fermentate at 0.5% sodium acetate against *Listeria monocytogenes* (Table 3).

TABLE 3

Effect of commercial and fermented sodium acetate on the growth of selected bacteria at pH 5.6, 30° C., and for 24 hours.

| | | | Bacterial growth (optical density 550 nm after 24 hrs) | | | |
| --- | --- | --- | --- | --- | --- | --- |
| Target strains | Time 0 | Control | C 0.25% | C 0.5% | F 0.25% | F 0.5% |
| *Listeria monocytogenes* | 0.010 | 0.216 | 0.216 | 0.063 | 0.110 | 0.010 |
| *Bacillus cereus* | 0.023 | 0.269 | 0.068 | 0.042 | 0.056 | 0.001 |
| *Escherichia coli* | 0.013 | 0.453 | 0.231 | 0.099 | 0.158 | 0.002 |
| *Salmonella typhimurium* | 0.012 | 0.294 | 0.089 | 0.020 | 0.062 | 0.001 |

C: commercial sodium acetate
F: Fermentate of sodium acetate produced via fermentation of *A. aceti*.

An additional challenge test was carried out on the bacterial cocktail strains of *Listeria monocytogenes, Escheriachia coli, Bacillus cereus*, and *Salmonella typhimurium*. Table 4 shows the effect of commercial sodium acetate on this cocktail at pH 5.6 and at 2° C. While commercial sodium acetate failed to inhibit the bacterial cocktail most probably due to the presence of *Listeria monocytogenes*, this fermented product at both concentrations used showed inhibitory effects on *Listeria monocytogenes, Escheriachia coli, Bacillus cereus,* and *Salmonella typhimurium* cocktails.

TABLE 4

Effect of commercial and fermented sodium acetate on the growth of selected bacteria at pH 5.6, 12° C., and for 12 days.

| Target strains | Time 0 | Control | Bacterial growth (optical density 550 nm after 12 days) | | | |
|---|---|---|---|---|---|---|
| | | | C 0.25% | C 0.5% | F 0.25% | F 0.5% |
| *L. monocytogenes* | 0.021 | 0.247 | 0.212 | 0.220 | 0.166 | 0.025 |
| *Bacillus cereus* | 0.014 | 0.387 | 0.017 | 0.017 | 0.014 | 0.012 |
| *Escherichia coli* | 0.016 | 0.339 | 0.017 | 0.013 | 0.008 | 0.011 |
| *S. typhimurium* | 0.013 | 0.242 | 0.010 | 0.013 | 0.017 | 0.010 |
| Cocktail (*L. monocytogenes Bacillus cereus Escherichia coli S. typhimurium*) | 0.021 | 0.304 | 0.287 | 0.266 | 0.036 | 0.016 |

C: commercial sodium acetate
F: Fermentate of sodium acetate produced via fermentation of *A. aceti*.

The fermentate of acetate, and especially sodium acetate, has the ability to inhibit the growth of Gram-negative bacteria. The production of acetate by fermentation with *Acetobacter aceti*, for example, gives better inhibitory results than commercial acetate on the growth inhibition of *Listeria monocytogenes*.

Example 3 - Challenge Test in Mashed Potato:

Five hundred grams of mashed potato were added to 500 g of distilled water and mixed thoroughly. The pH of the mixture was adjusted to pH 5.6 with 1N HCl. Three separate samples of 300 g of mashed potato were added with respectively, 0.5 % commercial sodium acetate, 0.5% of freeze dried fermentate and a control with no acetate. The three mashed potato samples (respectively with commercial acetate, fermentate and control) were heated at 70° C. for 5 min in a microwave and then dispatched aseptically in separate aliquots of 30 g each. The pH of all samples was checked before inoculation. Triplicate samples of each the three mashed potato aliquots were inoculated with $10^3$–$10^4$ colony forming units per gram (cfu/g) of Gram-negative bacterial cocktail (3 *E. Coli* strains and 3 *Salmonella* strains), or *L. monocytogenes* cocktail and incubated at 12° C. for 2 weeks. Periodically, samples were withdrawn and bacterial counts were enumerated using BHI agar and incubated at 30° C. for 48 hours.

To confirm the effectiveness of the two sources of sodium acetate against Gram-negative bacteria, a cocktail of Gram-negative bacteria was used in a challenge experiment in mashed potato. The results showed in Table 5 clearly indicated the inhibitory effectiveness of both commercial and fermented acetate on the growth of organisms such as *E. coli* and *Salmonella*.

TABLE 5

Effect of commercial and fermented acetate on the growth of Gram-negative bacteria in mashed potato (9 days of incubation at 12° C.).

| Time (days) | Microbial growth ($Log_{10}$ cfu/g) | | |
|---|---|---|---|
| | Control | Commercial acetate | Acetate Fermentate |
| 0 | 4.3 | 4.6 | 4.6 |
| 2 | 4.4 | 4.6 | 4.2 |
| 5 | 6.7 | 4.5 | 4.0 |
| 7 | 7.3 | 4.5 | 4.3 |
| 9 | 8.5 | 4.1 | 4.2 |

To confirm the effectiveness of the two sources of sodium acetate against *Listeria monocytogenes* strains, another challenge experiment in mashed potato was performed. The results showed in Table 6 clearly indicate that only the fermente of the invention delays the growth of *Listeria monocytogenes* cells for the whole incubation period (14 days of incubation at 12° C.). The commercial acetate is unable to delay the growth of this organism for more than a week, as showed in Table 6.

TABLE 6

Effect of commercial and fermented acetate on the growth *Listeria monocytogenes* strains in mashed potato (14 days of incubation at 12° C.).

| Time (days) | Microbial growth ($Log_{10}$ cfu/g) | | |
|---|---|---|---|
| | Control | Commercial acetate | Fermentate acetate |
| 0 | 3.1 | 3.1 | 3.1 |
| 2 | 6.4 | 4.4 | 3.1 |
| 5 | 8.8 | 4.3 | 3.0 |
| 7 | 8.7 | 4.9 | 2.8 |
| 14 | 8.7 | 7.5 | 3.0 |

What is claimed is:

1. Method of preservation of a food product comprising adding to a food product an alcohol-free fermentate comprising acetic acid and/or its salts, said fermentate produced by acetic acid-producing bacteria, and wherein the food is maintained at a pH of below 5.8.

2. Method of preservation of a food product according to claim 1, wherein the food product is maintained at a pH of between about 4.5 to 5.6.

3. Method of preservation of a food product according to claim 1, wherein the fermentate is added to the food product in an amount corresponding to a concentration of about 0.2 to 1% by weight of acetic acid and/or its salts based upon the weight of the food product.

4. Method of preservation of a food product according to claim 1, wherein the preservative is effective at chilled temperatures and chilled abuse temperatures.

5. Method of preservation of a food product according to claim 1, wherein the fermentate is added to the food product in a dry form.

6. Method of preservation of a food product according to claim 5, wherein the fermentate is dried by freeze-drying, spray drying or vacuum drying.

7. Method of preservation of a food product according to claim 5, wherein the fermentate is pasteurized before being dried.

8. Method of preservation of a food product according to claim 5, wherein the fermentate contains at least 65% by weight of acetate and/or its salts.

9. Method of preservation of a food product according to claim 5, wherein the acetate and/or its salts are produced by

*Acetobacter aceti, Gluconacetobacter liquefaciens, Gluconacetobacter xylinus, Gluconacetobacter hansenii, Gluconacetobacter diazotrophicus, Brachyspira pilosicoli* or *Gluconacetobacter europaeus*.

10. Method of preservation of a food product according to claim 1, wherein the fermentation is carried out for at least 2 days in a medium of culture comprising between about 0.05 to 2 wt % of carbohydrate(s), about 0.05 to 2 wt % peptone, about 0.1 to 1 wt % yeast extract, about 1 to 8 wt % alcohol, about 5 to 15 wt % of fermenting bacteria inoculum and water.

11. Method of preservation of a food product according to claim 10, wherein the fermentation is carried out for 5 to 10 days.

12. Method of preservation of a food product according to claim 1, wherein upon contamination by *Listeria monocytogenes*, the growth of said *L. monocytogenes* in the food product is delayed for at least 14 days.

* * * * *